Patented May 24, 1927.

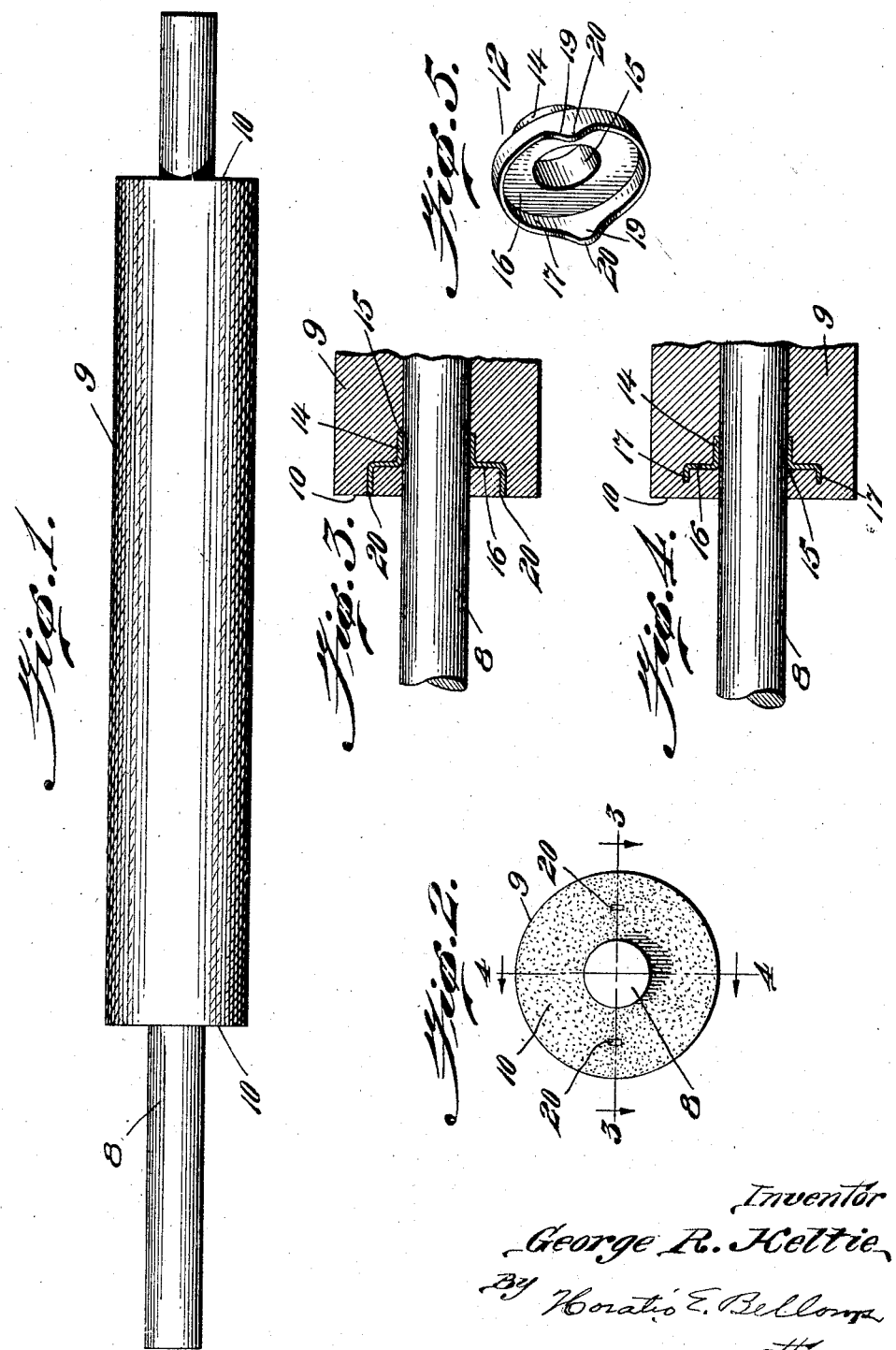

1,630,086

UNITED STATES PATENT OFFICE.

GEORGE R. KELTIE, OF WOONSOCKET, RHODE ISLAND, ASSIGNOR TO AMERICAN WRINGER COMPANY, INC., A CORPORATION OF RHODE ISLAND.

WRINGER ROLL.

Application filed January 6, 1927. Serial No. 159,378.

My invention relates to wringer rolls of that type wherein a metal shaft covered with rubber, rubber compounds or rubberized fabrics have bearing washers fastened to the shaft and embedded in the covering.

Heretofore it has been attempted in this type of roll to minimize the area of the rust accumulating metal upon the bearing ends of the roll by exposing only a metal annulus, but such an area produced excessive corrosion upon the roll exterior.

The essential objects of my present invention are to prevent or minimize such corrosion; to strengthen and effectively unify the entire roll; and to attain these ends in an inexpensively formed structure.

My invention consists, therefore, in the means for producing the results above specified substantially as hereinafter claimed.

In the accompanying drawings illustrating the principles of this invention and the best mode now known to me of applying that principle.

Figures 1 and 2 are a front and end elevation respectively of a wringer roll embodying my invention, Figures 3 and 4, fragmentary sections taken on lines 3—3 and 4—4 respectively of Figure 2, and Figure 5, a perspective view of one of the bearing members.

Similar characters of reference indicate like parts throughout the views.

In its present form of embodiment my roll includes a metal shaft 8 purposed for mounting in the wringer side bars, and embraced by a cylindrical body 9 of rubber or like material and provided with end faces 10.

Enclosed in the body near its ends are metal washers or bearing members 12. Each comprises an inwardly directed collar 14 bounding a central opening 15 in a disk 16 provided with a peripheral flange 17 directed oppositely to the collar 14. The parts 16 and 17 form a cup shaped body adapted to be secured to the shaft 8 by brazing or otherwise. In this instance such attachment is asssisted by the use of a collar 14 welded to the shaft near the end of the roll body 9.

Integral with flange 17 are a plurality of tapering lugs or projections 19. As herein shown the projections are two in number and are disposed diametrically opposite each other. The outer ends 20 are rounded or curved.

Each member 12 is embedded in the roll body 9 and is located such a distance longitudinally thereof as to bring the ends 20 of the projections substantially flush with the roll end faces 10, so that their tips are slightly if at all exposed. For this reason little if any area is subject to corrosion and the clothes operated on by the rolls are not in danger of becoming stained. At the same time the end faces or edges of the projections afford a substantial bearing to cooperate with the adjacent side bar of the frame to prevent the soft end face of the roll from wear. It will be further noted that the side edges of the projections serve to resist under strain the loosening or rotation of the roll body 9 relatively to the shaft 8 upon which the body is mounted.

I claim:—

1. In a wringer roll, a shaft, a cylindrical rubber body on the shaft, members encircling the shaft and bodily embedded within the rubber body and close to the end face of the body, and projections upon the members at a distance from the shaft and disposed substantially parallel thereto and terminating substantially in the end face of the body.

2. In a wringer roll, a shaft, a rubber body on the shaft, a flanged member on the shaft with the flange extending in the same general direction as the axis of the shaft and embedded within the said body, and projections on the flange of said member extended substantially parallel with the shaft and terminating substantially in the end face of the body.

3. As a new article of manufacture, a bearing member for a wringer roll, comprising a collar, a disk upon the collar, a flange upon the disk parallel with and directed oppositely to the collar, and projections on the flange extended parallel to the cylindrical surface of the flange and beyond the free end of the latter.

In testimony whereof I have affixed my signature.

GEORGE R. KELTIE.